June 19, 1951 H. F. ROBISON ET AL 2,557,314
WATTHOUR METER CALIBRATING SYSTEM
Filed May 1, 1948 4 Sheets-Sheet 1

INVENTORS.
Homer F. Robison,
Wilbur H. Wickham,
By Brown, Jackson, Boettcher & Dienner
Attys

Fig.5.

Patented June 19, 1951

2,557,314

UNITED STATES PATENT OFFICE 2,557,314

WATT-HOUR METER CALIBRATING SYSTEM

Homer F. Robison, Des Plaines, and
Wilbur H. Wickham, Elmhurst, Ill.

Application May 1, 1948, Serial No. 24,588

18 Claims. (Cl. 175—183)

Our invention relates, generally, to the comparison of speeds of rotation of two independently driven serrated discs. It has particular relation to electricity meter testing, calibrating and measuring systems and more specifically to the testing and calibrating of watthour meters.

At the present time there are two generally accepted methods for testing and calibrating watthour meters. Both of these methods are subject to several objections. However, as far as we have been able to determine, these methods are the best that have been available up to the present time.

One of these methods involves the actual counting by an observer of the number of revolutions of the watthour meter being tested during a measured time interval while the load is being held constant or by counting a predetermined number of revolutions of the meter being tested while a standard watthour meter, suitably connected, integrates the load. In order to provide any degree of accuracy in the testing and calibrating of a watthour meter under these conditions ordinarily it is necessary to count about twenty-five revolutions. It is necessary to do this after each adjustment of the meter being tested is made. Obviously this is a long and tedious process. It often requires several hours in order to calibrate a watthour meter using this method if adjustments are necessary. Moreover, it is subject to error in view of the human element involved in observing and counting the revolutions of the disc of the meter being tested. It is our understanding that this method of testing and calibrating watthour meters is one which has widespread use at the present time both in the field and in the factory where the meters are manufactured and tested. This method is the only one which is employed in the field for testing individual meters where they are installed. Because of the difficulties and delays incident to testing watthour meters by this method, the practice has arisen of substituting a properly tested and calibrated meter for a meter at a particular installation and then taking it to the test laboratory for checking rather than to check it on the spot. Where thousands of meters are in use on customers' premises, in sub-stations and in power generating stations, this method of meter substitution involves a tremendous amount of work, expense and delay.

The other method which is now well known employs stroboscopic means for comparing the speeds of the discs of the standard meter and the meter being tested. Because of the widespread use of this system of meter testing and calibration in the laboratory, it is now standard practice to manufacture the discs for watthour meters having serrated or toothed edges. The stroboscopic testing and calibrating method requires that the meter to be checked be placed in a jig and aligned accurately with the stroboscopic testing apparatus. The operatos is required to use a telescope to observe the images of the disc teeth in order to make the necessary stroboscopic comparison. This method, like the method used in counting the number of disc rotations, requires direct observation of one of the meter discs by the operator. From a practical standpoint the stroboscopic method for testing and calibrating watthour meters can be employed only in the factory or laboratory where the necessary exact positioning of the meter being tested in the stroboscopic testing apparatus can be accomplished. It is impractical to use the stroboscopic testing method in the field.

Among the objects of our invention are: to provide for testing and calibrating watthour meters in a simple, efficient and economic manner and for overcoming the foregoing deficiencies of the prior methods; to provide a system for testing and calibrating watthour meters that can be employed readily in the field for checking and testing a watthour meter where it is installed although it will be understood that the system can be employed in the laboratory and factory if desired; to provide an instantaneous comparison between the speed of the disc of the standard meter and the speed of the disc of the meter being tested; to adjust the meter which is being calibrated exactly the first time instead of adjusting it merely within limits after successive trials such as required when the method employing the counting of the disc revolutions is used; to eliminate any calculations in the calibration of a watthour meter; to compare the speeds of rotation of the discs of the standard meter and the meter being tested by generating a trace on the screen of a cathode ray tube which is the resulant of the two speeds; to interrupt a beam of light by the teeth of the disc of the meter for generating a periodic current the frequency of which is a function of its speed; to provide an optical system terminating in a photoelectric device for each disc; and to provide for adjusting the alternating voltage employed for testing and calibrating watthour meters over a wide range in relatively fine steps.

Other objects of our invention will, in part, be obvious and in part appear hereinafter.

Our invention is disclosed in the embodiment thereof shown in the accompanying drawings and it comprises the features of construction, combination of elements and arrangement of parts which will be exemplified in the construction hereinafter set forth and the scope of the application of which will be indicated in the appended claims.

For a more complete understanding of the nature and scope of our invention, reference can be had to the following detailed description, taken together with the accompanying drawings, in which.

Figure 5:
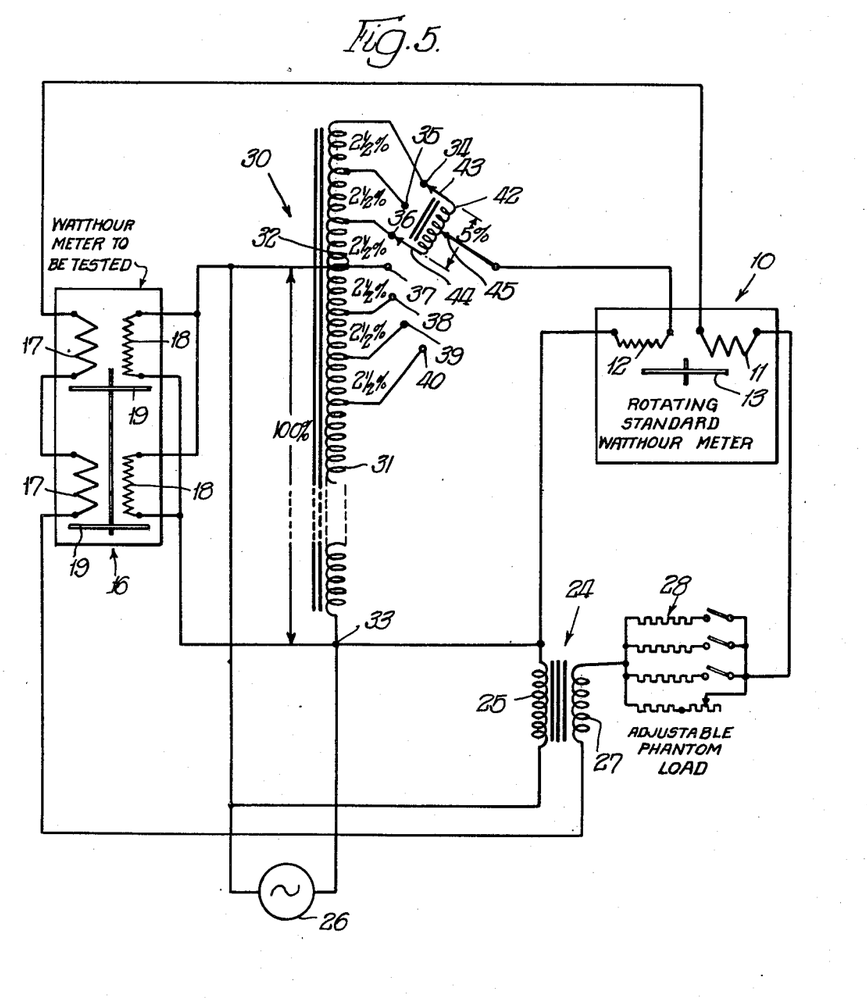
Figure 5 illustrates, diagrammatically, the circuit connections that can be employed for testing a watthour meter under various load conditions.

Referring now particularly to Figure 5 of the drawings, it will be observed that the reference character 10 designates a standard watthour meter which has a current coil 11, a potential coil 12 and a serrated disc 13. It will be understood that the watthour meter 10 is what is conventionally known as a rotating standard. It is calibrated in a laboratory so that it measures accurately the power flow therethrough.

The watthour meter to be tested is indicated, generally, at 16. For illustrative purposes a two element watthour meter is shown although it will be understood that the present invention can be employed for calibrating a single element watthour meter and that it can be used for calibrating watthour meters having more than two elements. The meter 16 includes current coils 17, potential coils 18 and serrated discs 19.

Figure 2:
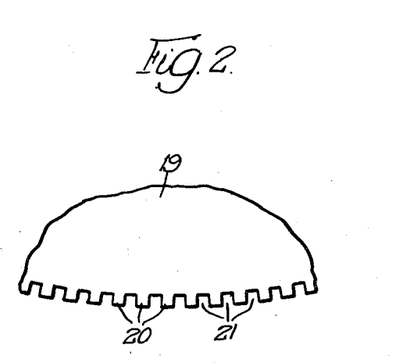
Figure 2 is a top plan view of a portion of a watthour meter disc at an enlarged scale and showing the teeth in its periphery.

In Figure 2 of the drawings, a portion of one of the discs 19 is shown at an enlarged scale. It will be understood that the disc 19 is of similar construction to the disc 13 although it may have a different number of teeth. The number of teeth on the disc edges of the various makes of watthour meters is such that the product of the number of teeth and the number of revolutions of the disc produced by a given load is the same or an even multiple. For example, some meters have 720 teeth with a disc constant of .6 while others have 400 teeth with disc constants of ⅓ or ⅔. As indicated hereinbefore, it is conventional practice at the present time to provide watthour meter discs with serrated or toothed edges to facilitate the stroboscopic testing thereof. In Figure 2 the teeth are indicated at 20 and the slots therebetween are indicated at 21. As will appear hereinafter, the present invention makes use of this serrated or toothed edge construction of watthour meters to control a system for testing and calibrating watthour meters which overcomes the various objections referred to above which are incident to the operation of present testing and calibrating systems.

It will be understood that the meter 16 to be tested may be either a meter located on the customer's premises on the wall, switchboard, or the like, or it may be located on a test bench in a laboratory as may be desired. While the present invention is intended primarily for testing and calibrating watthour meters in service, it can be used also in the factory or laboratory as will be understood readily.

It is customary to provide an adjustable phantom load in the testing and calibrating of watthour meters. For this purpose a transformer, shown generally at 24 in Figure 5, may be used having a primary winding 25 which may be connected for energization across a source 26 of alternating current, such as a 60 cycle 110 volt source. The transformer 24 is provided with a secondary winding 27 that, as shown, is connected in series circuit relation with an adjustable resistor, shown generally at 28, and in series circuit relation with the current windings 11 and 17. These connections are conventional.

An important feature of the present invention is the manner in which the voltage from the source 26 is applied in conjunction with the testing and calibrating of the meter 16. For this purpose an autotransformer, shown generally at 30, may be employed.

The autotransformer 30 includes a main inductor 31 which has terminals 32 and 33 that may be connected for energization across the source 26 of alternating current. It will be noted also that the potential coils 18 of the watthour meter 16 to be tested are connected in parallel and for energization to the source 26.

With a view to varying the connection of the potential coil 12 of the standard watthour meter 10 to the main inductor 31, it is provided with taps 34 through 40 which, as shown, may be located in spaced relationship therealong so that the voltage therebetween in terms of the voltage impressed across the terminals 32—33, which is considered to be one hundred per cent, is two and one-half per cent. In order to further subdivide the voltages provided by the taps 34 through 40 an auxiliary inductor 42 is provided having terminals 43 and 44 which, as shown, are arranged to be connected to alternate taps, such as the taps 34 and 36. It will be understood that the auxiliary inductor 42 can be swung so that it can be connected across taps 35 and 37, 36 and 38, 37 and 39, and 38 and 40. It will be understood that a voltage drop of five per cent takes place across the auxiliary inductor 42 in terms of the voltage impressed across the terminals 32—33. This five per cent voltage drop can be subdivided further by an adjustable connection 45 which is arranged to make connection to the individual turns of the auxiliary inductor 42. For example, if the auxiliary inductor 42 comprises 360 turns, then the voltage variation from turn to turn is 1/360 of five per cent.

It will be understood that suitable scales are provided for indicating the physical position of the auxiliary inductor 42 with respect to the taps 34 through 40, the scale being calibrated in per cent of the voltage impressed between the terminals 32—33. For example, when the auxiliary inductor 42 is in the position shown in Figure 5, the scale corresponding to its position will indicate a voltage of 102½ per cent. When the auxiliary inductor 42 is shifted so that it is connected across taps 38 and 40, its scale will indicate 92½ per cent. Similarly, a scale is provided which indicates the position of the adjustable connection 45. This scale is calibrated from zero to five per cent. It will be understood that the voltage impressed across the teminals of the potential coil 12 of the standard watthour meter 10 in per cent of the voltage applied between the terminals 32—33 is obtained by adding the scale indication for the adjustable connection 45 to the scale indication for the auxiliary inductor 42.

Figure 1:
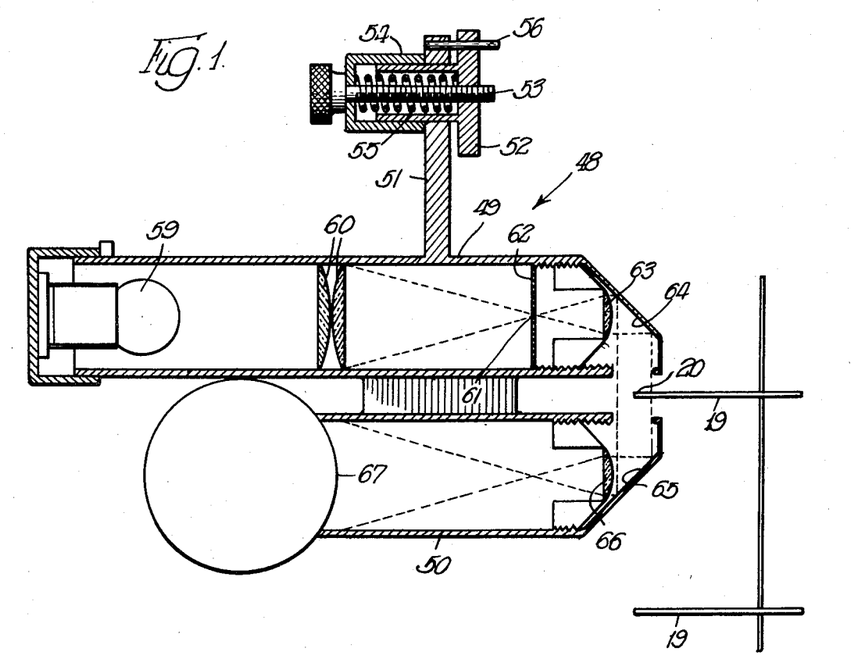
Figure 1 is a view, partly in section and partly diagrammatic, showing one of the two optical systems that is employed in practicing our invention.

In order to generate periodic currents the frequencies of which are functions of the speeds of rotation of the discs of the standard watthour meter 10 and the watthour meter 16 being tested, each of these meters is provided with an optical system one of which is indicated, generally, at 48 in Figure 1 of the drawings. Since the optical systems 48 for the two meters are identical, only one of them will be described.

The optical system 48 includes an upper tubular housing 49 and a lower tubular housing 50. The housings 49 and 50 are held in parallel spaced relation by means, not shown, and are arranged to be positioned so that their longitudinal axes extend radially of the disc 19 of the watthour 16 to be tested. It will be understood that the optical system for the standard watthour meter 10 is placed similarly.

It is desirable that means be provided for mounting the optical system 48 on the watthour meter 16 to be tested. For this purpose an arm 51 may be located on the upper tubular housing 49 for attachment to a bracket 52 that can be readily attached to and detached from the frame of the watthour meter 16 to be tested. It will be understood that the bracket 52 may have different shapes depending upon the particular construction of the watthour meter to be tested.

The arm 51 is movable with respect to the bracket 52 by an adjusting screw 53 which extends through a thimble 54 that is attached to the arm 51. A coil compression spring 55 bears against the bracket 52 and the thimble 54 and serves to bias the arm 51 and thereby the optical system 48 outwardly. A pin 56 extends from the arm 51 into a clearance hole in the bracket 52 and serves to prevent the optical system 48 from turning about the adjusting screw 53 as a center. It will be understood that the bracket 52 is mounted on the meter so that the axis of the optical system is in line with a radius of the disc. The distance of the optical system 48 from the center of the disc 19 can be varied by turning the adjusting screw 53.

Figure 3:
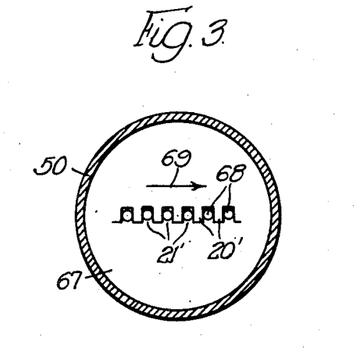
Figure 3 is a view showing the openings in the light shield and how the shadows of the teeth of the meter disc are thrown thereon by the optical system whereby light rays through the slots therebetween pass through these openings and impinge on the photoelectric multiplier tube at a frequency which is determined by the speed of rotation of the disc.

At the outer end of the upper tubular housing 49 there is located a bulb 59 which provides a source of light. Intermediate the ends of the housing 49 are lenses 60 which serve to focus the light from the bulb 59 onto an opening 61 in a wall 62 near the inner end of the housing 49. The opening 61 is at the focal point of a lens 63 which causes the light rays to become parallel for reflection by a mirror 64 which is located at an angle of 45° to the longitudinal axis of the housing 49. The mirror 64 directs the light rays downwardly where they are intercepted by the teeth 20 of the disc 19. The transmitted light rays from the mirror 64 are reflected by a mirror 65 underneath the disc 19 which is located at an angle of 45° to the longitudinal axis of the lower tubular housing 50. The light rays reflected by the mirror 65 are focused by a lens 66 onto a light shield 67. The lens 66 also magnifies the images of the teeth 20 of the disc 19 so that they appear generally as illustrated in Figure 3 of the drawings on the light shield 67. The images of the teeth 20 are indicated at 20' in Figure 3 while the spaces therebetween are indicated at 21'. The arrangement is such that these images are focused on the central portion of the light shield 67 where openings 68 are provided. It will be understood that the openings 68 have a diameter which is equal to the width of the magnified image 20' of the teeth 20 and that the distance between the openings 68 is the same as the distance between these magnified tooth images. As the disc 19 revolves, the openings 68 in the shield 67 are alternately covered and uncovered by the disc tooth shadows which can be considered for illustrative purposes as moving in the direction indicated by the arrow 69. This construction causes beams of light to be transmitted through the light shield 67 at frequencies which are determined by the speeds at which the disc 19 rotates. It remains now to show how these interrupted light beams are employed for testing and calibrating the operation of the watthour meter 16 against the operation of the standard watthour meter 10.

Figure 4:
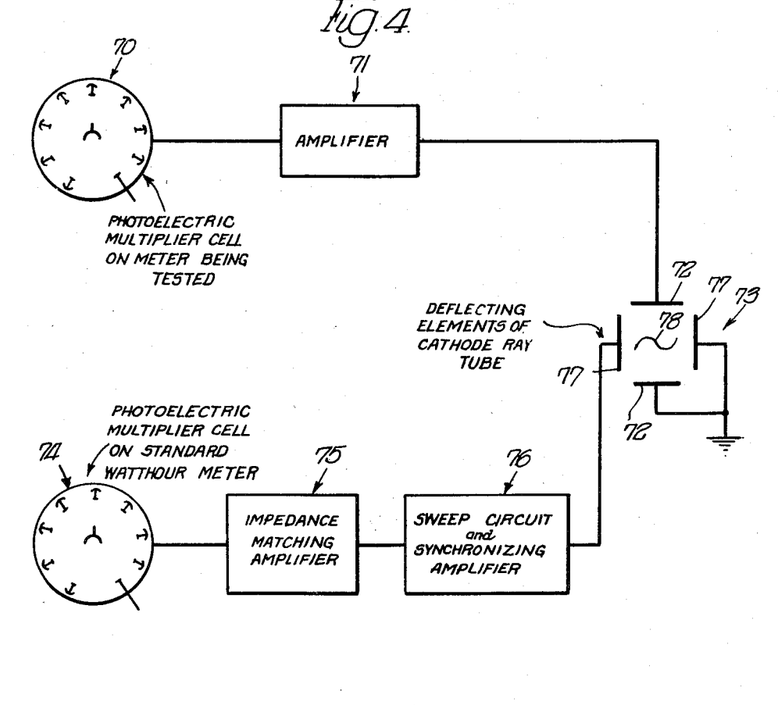
Figure 4 is a schematic diagram showing how the photoelectric multiplier tubes of the two optical systems can be connected to control a cathode ray tube to show on its screen a trace which is generated as a resultant of their conjoint operation.

In Figure 4 of the drawings there is illustrated schematically the manner in which the interrupted light beams through the openings 68 in the light shield 67 for each of the meters 10 and 16 can be utilized for the purposes set forth herein. As there shown, a photoelectric device, indicated generally at 70, may be provided in the form of a multiplier cell or phototube and incorporated in the optical system 48 mounted as described and shown in Figure 1. The photoelectric device 70, it will be understood, is located immediately behind the light shield 67 and is arranged to be energized alternately by light as the shadows 20' of the disc teeth 20 cover and uncover the openings 68. Such energization of the photoelectric device 70 generates a periodic current which can be amplified by the amplifier, shown generally at 71, and applied for controlling the energization of vertical deflecting elements or plates 72 of a cathode ray tube that is indicated, generally at 73.

Similarly, a photoelectric device 74, which may be a duplicate of the photoelectric device 70, is provided in the optical system associated with the standard watthour meter 10 for performing a like function. The photoelectric device 74 operates through an impedance matching amplifier that is indicated generally at 75. The impedance matching amplifier 75 is required since the impedance of the photoelectric device 74 is high but its power output is relatively low. The impedance matching amplifier controls the functioning of a sweep circuit and synchronizing amplifier that are indicated, generally, at 76. This sweep circuit and synchronizing amplifier 76 are connected as will appear in detail hereinafter, to control the energization of horizontal deflection elements or plates 77 of the cathode ray tube 73. It will be understood that the deflection elements or plates 77 are located at right angles to the deflecting elements or plates 72 so that together they generate a trace 78 on a screen 79, Figure 6, of the cathode ray tube 73.

Figure 6:
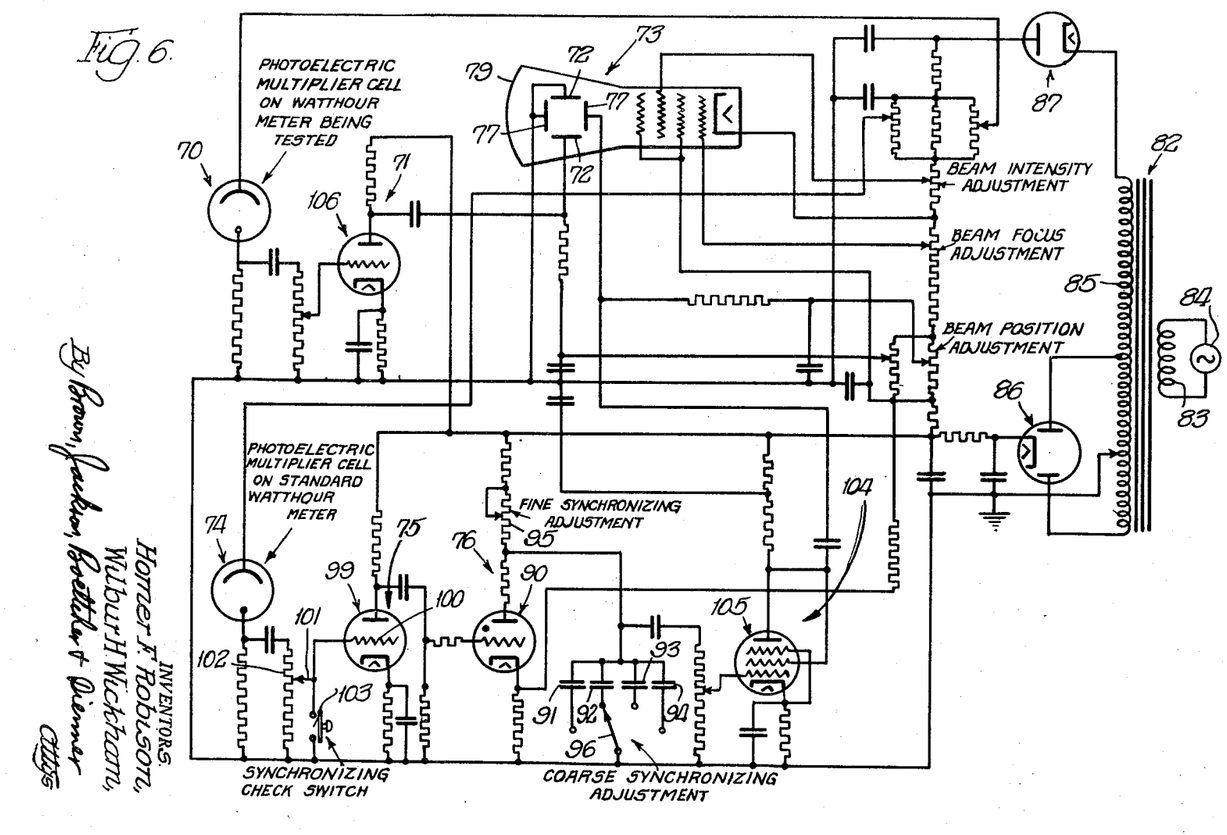
Figure 6 illustrates, diagrammatically, the circuit connections that can be used for controlling the cathode ray tube by the two photoelectric multiplier tubes.

In Figure 6 of the drawings, the details of the circuit connections are illustrated which are schematically shown in Figure 4. A transformer, indicated generally at 82, may be provided for energizing the circuits and it may include a primary winding 83 which may be connected for energization to a source 84, such as a 60 cycle 110 volt source. The transformer 82 also includes a high voltage secondary winding 85. Additional windings, not shown, are provided on the transformer 82 for energizing the heating elements of the various heater type thermionic devices employed in the system shown in Figure 6. In accordance with conventional practice these windings and the circuits to the various heater elements are not shown.

The high voltage secondary winding 85 is arranged to energize a full wave rectifier, that is indicated generally at 86. The full wave rectifier 86 is provided to supply plate potential for the various electric valves in the amplifiers and also in the sweep circuit. A half wave rectifier, shown generally at 87, also is employed and energized from the winding 85 to supply potential for the photoelectric devices 70 and 74 and the required control potentials for the deflecting elements or plates 72 and 77 of the cathode ray tube 73. Since the various connections shown in Figure 6 for controlling the adjustments of the cathode ray tube 73 are well known to those skilled in the art, they will not be described in detail herein other than as shown in this figure of the drawing and described by legends thereon.

The sweep frequency for the horizontal deflecting plates 77 of the cathode ray tube 73 is provided by a circuit which includes an electric valve 90 of the gas filled Thyratron type with the frequency being determined by a resistor-capacitor circuit which includes capacitors 91 through 94 and an adjustable resistor 95. The resistor 95 provides a fine synchronizing adjustment while the capacitors 91 through 94 provide the coarse adjustment. A selector switch 96 permits the connection, as shown, to any one of the capacitors 91 through 94.

Since the impedance of the sweep circuit including the valve 90 is relatively low and since it is desired to lock the frequency of the sweep circuit in synchronism with the frequency of the periodic current generated by the photoelectric device 74 associated with the standard watthour meter 10, and since the impedance of the photoelectric device 74 is relatively high, the impedance matching amplifier 75 is provided. It includes an electric valve 99 which has a control electrode 100. The control electrode 100 of the valve 99 is connected to a variable connection 101 along a resistor 102 which forms a part of the circuit associated with the photoelectric device 74. It will be understood that the impedance matching amplifier 75 is adjusted so that its impedance is of the same order as the impedance of the circuit including the photoelectric device 74 and, in this manner, the functioning of the valve 99 can be controlled. In turn the impedance matching amplifier 75 can control the functioning of the valve 90 of the sweep circuit by suitable adjustment so that it operates slightly in advance of the control provided by the resistor-capacitor circuit associated therewith.

With a view to removing the control of the photoelectric device 74 from the valve 90 of the sweep circuit in order to permit synchronizing of it with the frequency of the periodic current generated by the photoelectric device 70 associated with the watthour meter 16 to be tested, a synchronizing check switch 103 is connected between the variable connection 101 to the resistor 102 and ground. When the synchronizing switch 103 is closed, the control potential otherwise applied to the control grid 100 by the photoelectric device 74 is removed and the valve 90 of the sweep circuit is controlled entirely by the resistor-capacitor circuit associated therewith, the particular frequency being determined by their constants.

It will be noted that an amplifier, shown generally at 104, is interposed between the sweep circuit including the valve 90 and the horizontal deflecting elements or plates 77 of the cathode ray tube 73. The amplifier 104 includes an electric valve 105 of the multigrid type as shown. Also, it will be noted that the amplifier 71, which is interposed between the photoelectric device 70 and the vertical deflecting elements or plates 72, includes an electric valve 106.

In operation, the connections to the watthour meter 16 to be tested are made as illustrated in Figure 5 of the drawings. It is again pointed out that the present invention can be employed for testing and calibrating a single element watthour meter as well as a multi-element watthour meter. Except for the watthour meter 16 to be tested and the source 26 of alternating current, the apparatus illustrated in Figure 5 can be enclosed in a single case. Also enclosed in this case is an optical system 48 which is permanently mounted on the standard watthour meter 10. This case also includes all of the apparatus illustrated in Figure 6, except the photoelectric device 70, which is included in the optical system 48 that is detachably mounted on the watthour meter 16 to be tested, and the source 84 of alternating current. It will be understood that all that is required of the meter tester is that he make the connections to the watthour meter 16 to be tested and that he mount the optical system 48 thereon and plug the circuit connections thereto into a suitable jack located on the cabinet containing the test apparatus previously described. He adjusts the screw 53 so as to position the optical system 48 at the correct radial location with respect to the disc 19.

Assuming that the circuits are energized, as shown in the drawings, the meter tester first makes an "as found" check. He does this by operating the synchronizing check switch 103 to remove the control of the sweep circuit including the electric valve 90 from the photoelectric device 74. Then he adjusts the frequency of the sweep circuit by selector switch 96 and variable resistor 95 of Figure 6 to the approximate frequency of the periodic current generated by the photoelectric cell attached to the watthour meter to be tested. He then returns control of the sweep circuit to the photoelectric cell attached to the standard watthour meter by opening the synchronizing check switch 103. Next he adjusts the auxiliary inductor 42 of the autotransformer 30 and the adjustable connection 45 until the trace 78 on the screen 79 of the cathode ray tube 73 is stationary or oscillates slightly back and forth with respect to a central position as the disc of the meter 16 being tested changes its speed slightly in each revolution due to the anti-creep holes. The positions of the auxiliary inductor 42 and of the adjustable connections 45 show by the corresponding scale reading the exact per cent that the meter 16 being tested is inaccurate as compared to the standard watthour meter 10.

It is now in order to adjust the watthour meter 16 being tested so that it has the desired accuracy with respect to the standard watthour meter 10. This is accomplished by shifting the auxiliary inductor 42 and the adjustable connection 45 to the desired locations. Thereafter the usual adjustments are made on the meter 16 being tested. At the same time the trace on the screen 79 of the cathode ray tube 73 is observed. It will be understood that when the trace 78, Figure 4, is stationary or oscillates slightly about the center of the screen 79, the watthour meter being tested is operating in synchronism with the standard watthour meter 10. If the watthour meter 16 being tested is running slow then the trace 78 appears to shift. In the particular embodiment of the invention disclosed, the arrangement is such that when the watthour meter 16 being tested is slow the trace 78 appears to move to the right. When it is fast it appears to move to the left. By making the adjustment of the meter 16 while observing the position of the trace 78, it is possible in one adjustment to bring the meter 16 into the desired calibration. The advantages of this are obvious over the methods involving the counting of the disc revolutions or the use of the stroboscopic methods of comparison.

Since certain changes can be made in the foregoing construction and system without departing from the spirit and scope of this invention, it is intended that all matter shown in the accompanying drawings and described hereinbefore shall be interpreted as illustrative and not in a limiting sense.

We claim as our invention:

1. In a portable field type of instrument for testing and calibrating watthour meters in the field having discs with toothed edges which define large numbers of tooth spaces around their peripheries, in combination, a cathode ray tube having a screen and two pairs of deflecting elements at right angles to each other, sweep circuit means connected to control the energization of one of said pairs of deflecting elements, a standard watthour meter also having a disc with a toothed edge defining a large number of tooth spaces around its periphery; duplicate optical systems for the meter being tested and the standard meter each including a light source located on one side of the meter disc and arranged to transmit light in a direction substantially at right angles to the plane of the disc and through the tooth spaces between a limited number of its teeth, a light shield on the other side of said disc having openings corresponding to said tooth spaces and through which light from said source passes, said light being positively interrupted by the disc teeth and light shield at a frequency depending on the speed at which the disc rotates, and a photoelectric device behind said light shield and energized at said frequency; circuit means interconnecting the photoelectric device of the optical system associated with said standard meter and said sweep circuit to control it as a function of the speed of the disc of said standard meter, circuit means interconnecting the photoelectric device of the optical system associated with the meter being tested and the other of said pairs of deflecting elements whereby the energization thereof is controlled as a function of the speed of the disc of said meter being tested, the resulting trace on said screen providing a comparison between the speeds of the discs of said test and standard meters, and means associated with said sweep circuit means enabling the sweep frequency response to be adjusted relatively to the frequency of the pulses from the photoelectric device responding to said standard meter, whereby the same standard meter can be used to calibrate meters having different numbers of disc teeth and different disc constants.

2. In a portable field type of instrument for testing and calibrating watthour meters in the field having discs with toothed edges, in combination, a cathode ray tube having a screen and two pairs of deflecting elements at right angles to each other, sweep circuit means connected to control the energization of one of said pairs of deflecting elements, a standard watthour meter also having a disc with a toothed edge; duplicate optical systems for the meter being tested and the standard meter each including a light source located on one side of the meter disc and arranged to transmit light through the spaces between a limited number of its teeth, a light shield on the other side of said disc having openings corresponding to said spaces and through which light from said source passes and is interrupted at a frequency depending on the speed at which the disc rotates, and a photoelectric device behind said light shield and energized at said frequency; circuit means interconnecting the photoelectric device of the optical system associated with said standard meter and said sweep circuit to control it as a function of the speed of the disc of said standard meter, circuit means interconnecting the photoelectric device of the optical system associated with the meter being tested and the other of said pairs of deflecting elements whereby the energization thereof is controlled as a function of the speed of the disc of said meter being tested, and "as found" checking apparatus comprising a manually operated synchronizing check switch connected to render the photoelectric device of the optical system associated with said standard meter ineffective to control said sweep circuit, and adjustable circuit means cooperating with said sweep circuit to synchronize the same with the frequency generated by the disc of the meter being tested during the "as found" checking operation.

3. In a portable field type of instrument for testing and calibrating watthour meters in the field having discs with toothed edges, in combination, a cathode ray tube having a screen and two pairs of deflecting elements at right angles to each other, sweep circuit means connected to control the energization of one of said pairs of deflecting elements, a standard watthour meter also having a disc with a toothed edge; duplicate optical systems for the meter being tested and the standard meter each including a light source located on one side of the meter disc and arranged to transmit light through the spaces between a limited number of its teeth, a light shield on the other side of said disc having openings corresponding to said spaces and through which light from said source passes and is interrupted at a frequency depending on the speed at which the disc rotates, and a photoelectric device behind said light shield and energized at said frequency; circuit means including an amplifier having an impedance matching that of the photoelectric device of the optical system associated with said standard meter interconnecting the same and said sweep circuit to control it as a function of the speed of the disc of said standard meter, circuit means interconnecting the photoelectric device of the optical system associated with the meter being tested and the other of said pairs of deflecting elements whereby the energization thereof is controlled as a function of the speed of the disc of said meter being tested, the resulting trace on said screen providing a comparison between the speeds of the discs or said test and standard meters, and means for supplying to the potential coil of said standard watthour meter a variable potential which can be adjusted to a value above or below line voltage, said latter means comprising a multiple tap auto-transformer adapted to be connected between the line and said potential coil.

4. In a portable field instrument for testing and calibrating disc type watthour meters in the field, in combination, a cathode ray tube having a screen and two pairs of deflecting elements at right angles to each other, sweep circuit means connected to control the energization of one of said pairs of deflecting elements, a standard disc type watthour meter; duplicate optical systems for the meter being tested and the standard meter each including a light source, a light shield and a photoelectric device cooperating with the meter disc so that said photoelectric device is energized at a frequency determined by the speed of the disc; circuit means interconnecting the photoelectric device of the optical system associated with said standard meter and said sweep circuit to control it as a function of the speed of the disc of said standard meter, circuit means interconnecting the photoelectric device of the optical system associated with the meter being tested and the other of said pairs of deflecting elements whereby the energization thereof is controlled as a function of the speed of the disc of said meter being tested, the resulting trace on said screen providing a comparison between the speeds of the discs of said test and standard meters, and means associated with said sweep circuit means enabling the sweep frequency response to be adjusted relatively to the frequency of the pulses from the photoelectric device responding to said standard meter, whereby the same standard meter can be used to calibrate meters having different numbers of disc teeth or different disc constants.

5. In a portable field instrument for testing and calibrating disc type watthour meters in the field, in combination, a cathode ray tube having a screen and two pairs of deflecting elements at right angles to each other, sweep circuit means connected to control the energization of one of said pairs of deflecting elements, a standard disc type watthour meter; duplicate optical systems for the meter being tested and the standard meter each including a light source, a light shield and a photoelectric device cooperating with the meter disc so that said photoelectric device is energized at a frequency determined by the speed of the disc; circuit means interconnecting the photoelectric device of the optical system associated with said standard meter and said sweep circuit to control it as a function of the speed of the disc of said standard meter, circuit means interconnecting the photoelectric device of the optical system associated with the meter being tested and the other of said pairs of deflecting elements whereby the energization thereof is controlled as a function of the speed of the disc of said meter being tested, manually operable means connected to render the photoelectric device of the optical system associated with said standard meter ineffective to control said sweep circuit, and adjustable circuit means cooperating with said sweep circuit to synchronize the same with the frequency generated by the disc of the meter being tested.

6. In a portable field instrument for testing and calibrating disc type watthour meters in the field, in combination, a cathode ray tube having a screen and two pairs of deflecting elements at right angles to each other, sweep circuit means connected to control the energization of one of said pairs of deflecting elements, a standard disc type watthour meter; duplicate optical systems for the meter being tested and the standard meter each including a light source, a light shield and a photoelectric device cooperating with the meter disc so that said photoelectric device is energized at a frequency determined by the speed of the disc; circuit means including an amplifier having an impedance matching that of the photoelectric device of the optical system associated with said standard meter interconnecting the same and said sweep circuit to control it as a function of the speed of the disc of said standard meter, circuit means interconnecting the photoelectric device of the optical system associated with the meter being tested and the other of said pairs of deflecting elements whereby the energization thereof is controlled as a function of the speed of the disc of said meter being tested, the resulting trace on said screen providing a comparison between the speeds of the discs of said test and standard meters, and apparatus for making an "as found" check of the meter being tested including means for varying the speed of one meter with respect to the speed of the other.

7. In a system for generating a frequency which is a function of the speed at which the disc of a watthour meter rotates, in combination, a watthour meter having a disc with a toothed edge, a tubular housing extending radially from said disc on one side thereof, a light source at the outer end of said housing, an apertured wall near the inner end of said housing, lens means between said source and said wall for focusing light from the former on the opening in the latter, a mirror at the inner end of said housing inclined at an angle of 45° to its longitudinal axis and positioned in overlapping relation to the toothed edge of said disc, lens means between said wall and said mirror for directing the light rays parallel to said longitudinal axis for reflection by said mirror through the spaces between said teeth, a second tubular housing extending radially from said disc on the other side thereof, a light shield at the outer end of said second housing, a mirror at the inner end of said second housing inclined at an angle of 45° to its longitudinal axis onto which fall light rays reflected by the first mentioned mirror except as they are intercepted by a limited number of said teeth, lens means intermediate the ends of said second housing for magnifying the images of said teeth as reflected by the second mentioned mirror and focusing them on said light shield, said light shield having openings therethrough having a width corresponding to the width of the magnified tooth image and spaced apart a distance equal to the distance between magnified tooth images, and a photoelectric device behind said light shield for receiving the light transmitted through said openings to generate the frequency as aforesaid.

8. In a system for generating a frequency which is a function of the speed at which the disc of a watthour meter rotates, in combination, a watthour meter having a disc with a toothed edge, a tubular housing extending radially from said disc on one side thereof, a light source at the outer end of said housing, an apertured wall near the inner end of said housing, lens means between said source and said wall for focusing light from the former on the opening in the latter, a mirror at the inner end of said housing inclined at an angle of 45° to its longitudinal axis and positioned in overlapping relation to the toothed edge of said disc, lens means between said wall and said mirror for directing the light rays parallel to said longitudinal axis for reflection by said mirror through the spaces between said teeth, a second tubular housing extending radially from said disc on the other side thereof, a light shield at the outer end of said second housing, a mirror at the inner end of said second housing inclined at an angle of 45° to its longitudinal axis onto which fall light rays reflected by the first mentioned mirror except as they are intercepted by a limited number of said teeth, lens means intermediate the ends of said second housing for magnifying the images of said teeth as reflected by the second mentioned mirror and focusing them on said light shield, said light shield having openings therethrough having a width corresponding to the width of the magnified tooth image and spaced apart a distance equal to the distance between magnified tooth images, a photoelectric device behind said light shield for receiving the light transmitted through said openings to generate the frequency as aforesaid, and manually operable means for adjusting the radial positions of said housings with respect to said disc for varying the intersection of said teeth with respect to the light rays between said mirrors.

9. In a system for testing and calibrating watthour meters having potential coils using a standard watthour meter having a potential coil, means for varying the voltage applied to the latter comprising, in combination, circuit means for connecting a potential coil of a watthour meter to be tested for energization to a supply line source of alternating current, a main inductor having a plurality of uniformly spaced taps at one end, circuit means for interconnecting an intermediate tap and the other end of said main inductor for energization to said source of alternating current, an auxiliary inductor arranged to be connected to alternate ones of said taps, a variable connection along said auxiliary inductor, and circuit means connecting the potential coil of a standard watthour meter between said other end of said main inductor and said variable connection, whereby the voltage supplied to the potential coil of said watthour meter can be adjusted to a value either higher or lower than the voltage of said supply line.

10. In a system for comparing the speeds of rotation of two independently driven discs having toothed edges, in combination, a cathode ray tube having a screen and two pairs of deflecting elements at right angles to each other, sweep circuit means connected to control the energization of one of said pairs of deflecting elements; duplicate optical systems for each disc each including a light source located on one side of each disc and arranged to transmit light through the spaces between a limited number of its teeth, a light shield on the other side of each disc having openings corresponding to said spaces and through which light from said source passes and is interrupted at a frequency depending on the speed at which the disc rotates, and a photoelectric device behind each light shield and energized at said frequency; circuit means interconnecting one photoelectric device and said sweep circuit means to control it as a function of the speed of the associated disc, and circuit means interconnecting the other photoelectric device and the other of said pairs of deflecting elements whereby energization thereof is controlled as a function of the speed of the associated disc, the resulting trace on said screen providing a comparison between the speeds of said discs.

11. In a system for comparing the speeds of rotation of two independently driven discs having toothed edges, in combination, a cathode ray tube having a screen and two pairs of deflecting elements at right angles to each other, sweep circuit means connected to control the energization of one of said pairs of deflecting elements; duplicate optical systems for each disc each including a light source located on one side of each disc and arranged to transmit light through the spaces between a limited number of its teeth, a light shield on the other side of each disc having openings corresponding to said spaces and through which light from said source passes and is interrupted at a frequency depending on the speed at which the disc rotates, and a photoelectric device behind each light shield and energized at said frequency; circuit means interconnecting one photoelectric device and said sweep circuit means to control it as a function of the speed of the associated disc, manually operable means connected to render said photoelectric device ineffective to control said sweep circuit, adjustable circuit means cooperating with said sweep circuit to synchronize the same with the frequency of the other disc, means for varying the speed of said other disc with respect to the speed of the associated disc, and circuit means interconnecting the other photoelectric device and the other of said pairs of deflecting elements whereby energization thereof is controlled as a function of the speed of said other disc, the resulting trace on said screen providing a comparison between the speeds of said discs.

12. In a system for generating a frequency which is a function of the speed of rotation of a member having a toothed periphery, in combination, a tubular housing extending radially from said member on one side of its toothed periphery, a light source at the outer end of said housing, an apertured wall near the inner end of said housing, lens means between said source and said wall for focusing light from the former on the opening in the latter, a mirror at the inner end of said housing inclined at an angle of 45° to its longitudinal axis and positioned in overlapping relation to the toothed periphery of said disc, lens means between said wall and said mirror for directing the light rays parallel to said longitudinal axis for reflection by said mirror through the spaces between said teeth, a second tubular housing extending radially from said member on the other side of its toothed periphery, a light shield at the outer end of said second housing, a mirror at the inner end of said second housing inclined at an angle of 45° to its longitudinal axis onto which fall light rays reflected by the first mentioned mirror except as they are intercepted by a limited number of said teeth, lens means intermediate the ends of said second housing for magnifying the images of said teeth as reflected by the second mentioned mirror and focusing them on said light shield, said light shield having openings therethrough having a width corresponding to the width of the magnified tooth image and spaced apart a distance equal to the distance between magnified tooth images, and a photoelectric device behind said light shield for receiving the light transmitted through said openings to generate the frequency as aforesaid.

13. In a portable field type of device for testing and calibrating watthour meters in the field having discs provided with toothed edges defining substantially hundreds of tooth spaces around their peripheries, the combination of a cathode ray tube having a screen and two pairs of deflecting elements at right angles to each other, sweep circuit means connected to control the energization of one of said pairs of deflecting elements, a standard watthour meter also having a disc provided with a toothed edge defining substantially hundreds of tooth spaces around its periphery, duplicate optical systems for the meter being tested and the standard meter each including a light source located on one side of the meter disc and arranged to transmit light in a direction substantially at right angles to the plane of the disc and through the tooth spaces between a limited number of its teeth, a light shield on the other side of said disc having openings corresponding to said tooth spaces and through which light from said source passes, said light being positively interrupted by the disc teeth and light shield at a frequency depending upon the speed at which the disc rotates, and a photoelectric device behind said light shield and energized at said frequency; circuit means interconnecting the photoelectric device of the optical system associated with the meter being tested and the other of said pairs of deflecting elements whereby the energization thereof is controlled as a function of the speed of the disc of the meter being tested, a thyratron tube controlling said sweep circuit, an adjustable resistor-capacitor circuit adjustably controlling said thyratron tube for synchronizing the latter substantially to the frequency of the photoelectric pulses from the standard meter, an impedance matching amplifier operatively connecting the photoelectric device associated with the standard meter and said thyratron tube, a synchronizing check switch operatively connected between said latter photoelectric device and said impedance matching amplifier for rendering said amplifier ineffective to control said thyratron tube, and adjusting means for varying the potential supplied to the potential coil of the standard meter, said latter adjusting means comprising an auto-transformer capable of supplying a voltage to said potential coil higher than line voltage.

14. In a portable field type of device for testing and calibrating watthour meters in the field having discs provided with toothed edges defining substantially hundreds of tooth spaces around their peripheries, the combination of a cathode ray tube having a screen and two pairs of deflecting elements at right angles to each other, sweep circuit means connected to control the energization of one of said pairs of deflecting elements, a standard watthour meter also having a disc provided with a toothed edge defining substantially hundreds of tooth spaces around its periphery, duplicate optical systems for the meter being tested and the standard meter each including a light source located on one side of the meter disc and arranged to transmit light in a direction substantially at right angles to the plane of the disc and through the tooth spaces between a limited number of its teeth, a light shield on the other side of said disc having openings corresponding to said tooth spaces and through which light from said source passes, said light being positively interrupted by the disc teeth and light shield at a frequency depending upon the speed at which the disc rotates, and a photoelectric device behind said light shield and energized at said frequency; circuit means interconnecting the photoelectric device of the optical system associated with the meter being tested and the other of said pairs of deflecting elements whereby the energization thereof is controlled as a function of the speed of the disc of the meter being tested, a thyratron tube controlling said sweep circuit, an adjustable resistor-capacitor circuit adjustably controlling said thyratron tube for synchronizing the latter substantially to the frequency of the photoelectric pulses from the standard meter, an impedance matching amplifier operatively connecting the photoelectric device associated with the standard meter and said thyratron tube, a synchronizing check switch operatively connected between said latter photoelectric device and said impedance matching amplifier for rendering said amplifier ineffective to control said thyratron tube, and adjusting means for varying the potential supplied to the potential coil of the standard meter, said latter adjusting means comprising an auto-transformer capable of supplying a voltage to said potential coil higher than line voltage, said adjustable resistor-capacitor circuit enabling the sweep frequency response to the thyratron tube to be adjusted to a fraction or to an integral multiple of the frequency of the pulses from the photoelectric device responding to the standard meter, whereby the same standard meter can be used to calibrate meters having different numbers of disc teeth and different disc constants.

15. In a portable field type of device for testing and calibrating watthour meters in the field having discs provided with toothed edges defining hundreds of tooth spaces around their peripheries, the combination of a cathode ray tube having a screen and two pairs of deflecting elements substantially at right angles to each other, sweep circuit means connected to control the energization of one of said pairs of deflecting elements, a standard watthour meter also having a disc provided with a toothed edge defining hundreds of tooth spaces around its periphery, similar optical systems for the meter being tested and the standard meter each including a light source located on one side of the meter disc and arranged to transmit light through the tooth spaces between a limited number of its teeth, a light shield on the other side of each disc having openings corresponding to said tooth spaces and through which light from said source passes and is interrupted at a frequency depending upon the speed at which the disc rotates, and a photoelectric device behind each light shield and energized at said frequency; circuit means interconnecting one photoelectric device and said sweep circuit means to control it as a function of the speed of the associated disc, and circuit means interconnecting the other photoelectric device and the other of said pairs of deflecting elements whereby energization thereof is controlled as a function of the speed of the associated disc, the resulting trace on said screen providing a comparison between the speeds of said discs.

16. In a device of the class described for testing and calibrating watthour meters having discs provided with toothed edges defining a large number of tooth spaces around their peripheries, the combination of a cathode ray tube having a screen and two pairs of deflecting elements substantially at right angles to each other, sweep circuit means connected to control the energization of one of said pairs of deflecting elements, a standard watthour meter also having a disc provided with a toothed edge defining a large number of tooth spaces around its periphery, substantially similar optical systems for the meter being tested and the standard meter each including a light source located and arranged to transmit light through the tooth spaces of its respective meter disc, and a photoelectric device located and arranged to respond to the interruptions in the light beam caused by the rotation of said tooth spaces, circuit means interconnecting one photoelectric device and said sweep circuit means to control it as a function of the speed of the associated disc, and circuit means interconnecting the other photoelectric device and the other of said pairs of deflecting elements whereby energization thereof is controlled as a function of the speed of the associated disc, the resulting trace on said screen providing a comparison between the speeds of said discs.

17. In a system for generating a frequency which is a function of the speed at which the disc of a watthour meter rotates, the combination of a watthour meter having a disc with a toothed edge defining a large number of tooth spaces around the disc periphery, a light source arranged to project a beam of light in a direction substantially parallel to the plane of the meter disc, means for turning said light beam through substantially a right angle for passage through the tooth spaces of said disc, means for again turning the light beam through substantially a right angle on the other side of the meter disc for projection in an outward direction substantially parallel with the plane of the meter disc, a light shield in the path of said outwardly projected portion of the light beam, said light shield having openings corresponding to said tooth spaces and through which light from said source passes and is interrupted at a frequency depending upon the speed at which the meter disc rotates, and a photoelectric device behind said light shield and energized at said frequency.

18. In a system for generating a frequency which is a function of the speed at which the disc of a watthour meter rotates, the combination of a watthour meter having a disc with a toothed edge defining a large number of tooth spaces around the disc periphery, a light source arranged to project a beam of light in a direction substantially parallel to the plane of the meter disc, means for turning said light beam to substantially a right angle for passage through the tooth spaces of said disc, means for again turning the light beam through substantially a right angle on the other side of the meter disc for projection in an outward direction substantially parallel with the plane of the meter disc, and a photoelectric device responding to said outwardly projected light beam.

HOMER F. ROBISON.
WILBUR H. WICKHAM.

REFERENCES CITED

The following references are of record in the file of this patent:

UNITED STATES PATENTS

| Number | Name | Date |
| --- | --- | --- |
| 1,005,758 | Wilkins | Oct. 10, 1911 |
| 1,721,375 | Koning | July 16, 1929 |
| 1,857,593 | Hill | May 10, 1932 |
| 1,878,658 | Aronoff | Sept. 20, 1932 |
| 2,123,115 | Maillat | July 5, 1938 |

OTHER REFERENCES

Article by Freeman in Electrical Review, January 7, 1944, pages 12–14.

Bureau of Standards Letter Circular LC-731, August 28, 1943, page 16.